(12) United States Patent
Reed

(10) Patent No.: US 7,109,416 B1
(45) Date of Patent: Sep. 19, 2006

(54) ELECTRICAL WIRING ACCESS BOX

(76) Inventor: Norman Reed, P.O. Box 211, Clearwater, FL (US) 33757

( * ) Notice: Subject to any disclaimer, the term of this patent is extended or adjusted under 35 U.S.C. 154(b) by 0 days.

(21) Appl. No.: 11/283,338

(22) Filed: Nov. 21, 2005

(51) Int. Cl.
*H02G 3/08* (2006.01)

(52) U.S. Cl. .................. 174/50; 174/53; 174/481; 174/60; 220/3.2; 220/3.3

(58) Field of Classification Search .............. 174/60, 174/53, 58, 57, 68.1, 65 R, 50, 481; 220/3.2, 220/3.3, 3.4, 3.5, 3.6, 3.7, 3.8, 3.9, 4.02; 248/906; 439/535, 536, 537, 538, 539, 949, 439/925; D13/152; 285/154.1, 149.1
See application file for complete search history.

(56) References Cited

U.S. PATENT DOCUMENTS

| | | | | |
|---|---|---|---|---|
| 609,356 A | * | 8/1898 | Krantz .................. | 220/3.8 |
| 642,521 A | * | 1/1900 | Greenfield ............... | 220/3.8 |
| 4,223,796 A | * | 9/1980 | Silver .................... | 220/3.8 |
| 5,679,924 A | * | 10/1997 | Young et al. ............. | 220/3.4 |
| 5,700,977 A | * | 12/1997 | Ford et al. ............... | 174/65 R |
| 5,783,774 A | * | 7/1998 | Bowman et al. ........... | 220/3.2 |
| 5,942,728 A | * | 8/1999 | Chen .................... | 174/65 R |
| 6,069,317 A | * | 5/2000 | Wagganer ................ | 174/65 R |
| 6,099,340 A | * | 8/2000 | Florentine ............... | 439/521 |
| 6,395,978 B1 | * | 5/2002 | Whitehead et al. ........ | 174/58 |

* cited by examiner

*Primary Examiner*—Angel R. Estrada
(74) *Attorney, Agent, or Firm*—Thomas Frost

(57) ABSTRACT

A detachable cover and base for housing open standard electrical wiring, the cover and the base having shoulders portions which readily engage and disengage. When coupled the shoulder portions form tubular projections that hold electrical conduits containing electrical wiring. A gasket is provided between the base and the cover to form a waterproof barrier. The tubular projections are perpendicular to walls of the cover and the base, and allow electrical wiring to be connected from multiple directions within a residence.

10 Claims, 9 Drawing Sheets

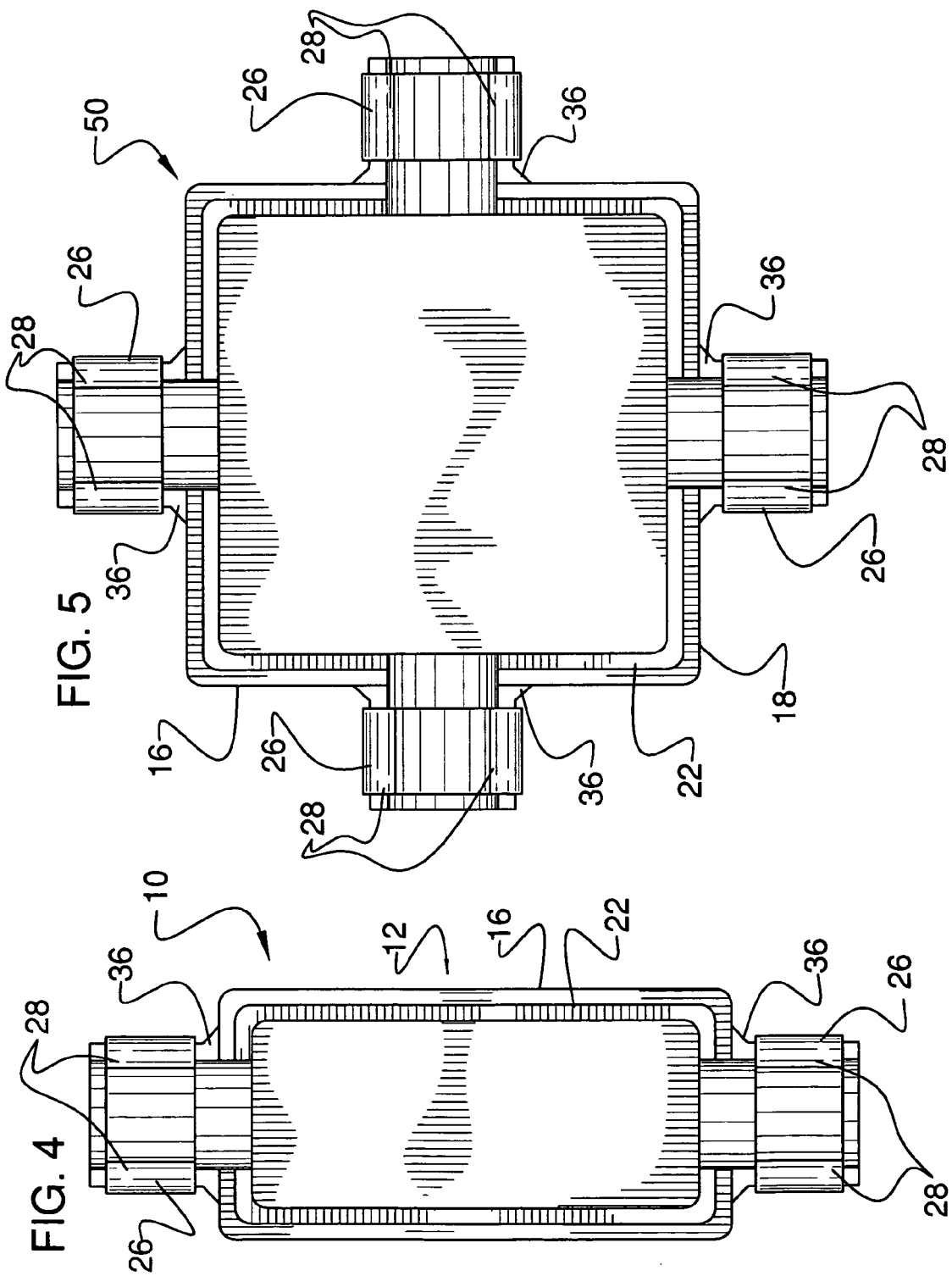

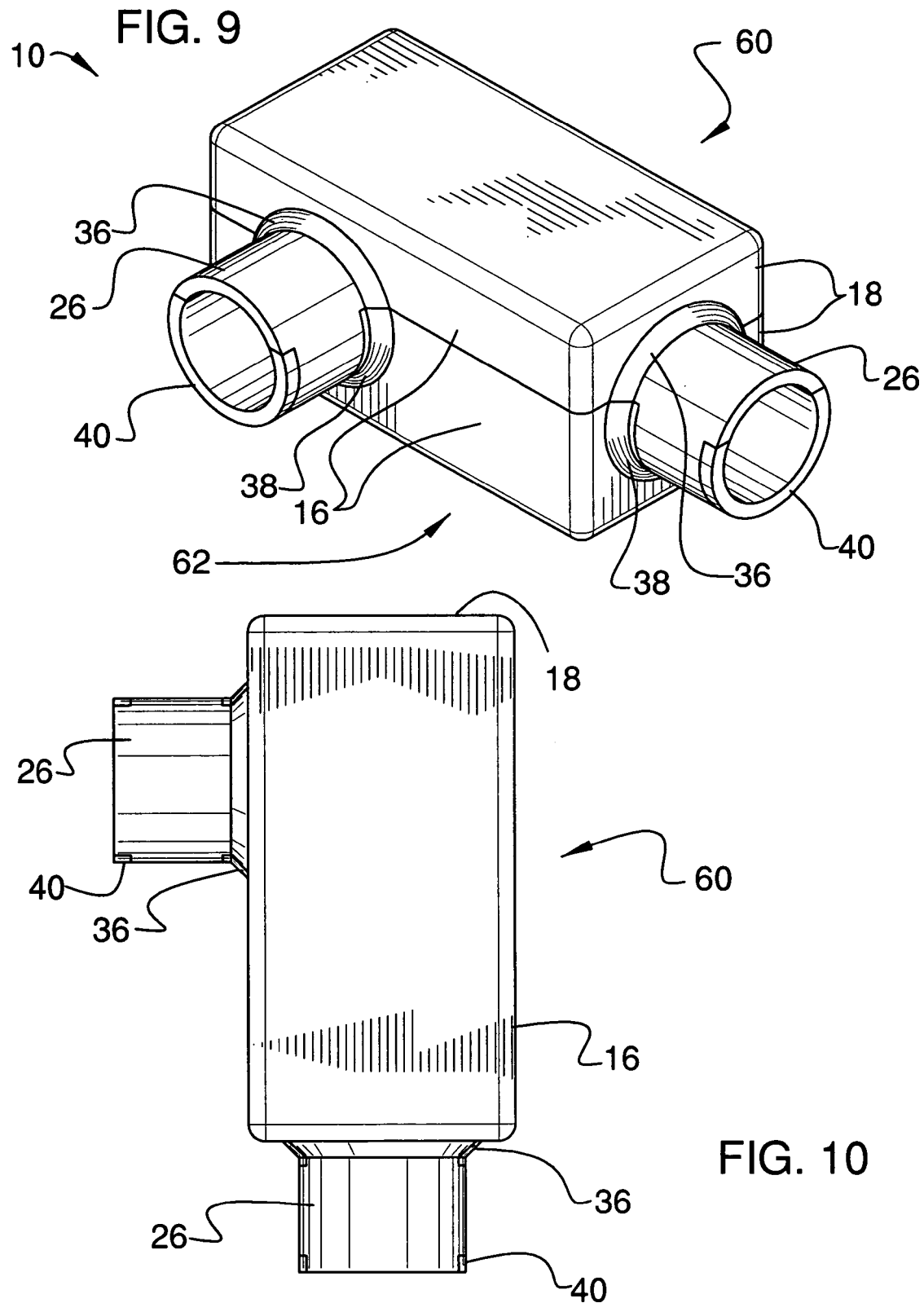

ELECTRICAL WIRING ACCESS BOX

FIELD OF THE INVENTION

The present invention relates generally to an access box assembly for coupling open lines in a residence. More particularly, relating to an access box having a top and bottom housing which attach via coupled shoulder portions making the assembly of the box, and containment of the open lines, easier and faster.

BACKGROUND OF INVENTION

The use of a hinged or two piece junction box is known in the prior art. For example, U.S. Pat. No. 6,099,340 which issued to Florentine discloses a waterproof container for electrical plugs and sockets having an upper and lower housing attached by a hinge. A latch and catch comprise the locking arrangement. U.S. Pat. No. 3,838,213 which issued to Georgopulos discloses a hinged electrical component container with a catch and latch closing mechanism.

Another patent of interest is U.S. Pat. No. 5,306,870 which issued to Abat, wherein there is disclosed an electrical component housing with two plastic shrouds that mate via hooks and openings.

To comply with local and state electrical codes open lines in a residence are covered with a junction box, also known in many circumstances as a conduit body. Currently tools are a necessity when installing wiring running from electrical conduits, for example in most conduit bodies a plate held by screws is removed from the top of the conduit body prior to positioning wiring within the box. Two persons are needed, one to shut down the electrical power supply to the electrical line being accessed (at the breaker/fuse box), and another person at the line to measure the voltage. When installing the box (conduit body), the lines within the electrical conduits need to be disconnected and feed into the cavity of the box through openings formed as part of the box. The lines are wired back together and power is restored. Many times the wires become tangled or are difficult fitting into the junction box. Open lines without proper junction box coverage (in violation of safety codes) are present in many homes. Before closing on a house during a resale, this situation needs to be corrected.

While all of the inventions described in the above patents fulfill their respective particular objectives and requirements, none of the aforementioned patents illustrate or describe an access box serving as an aftermarket junction box on existing homes or during new construction to comply with local and state electrical codes.

In this respect, one person, with no tools or without disconnecting the power, can position the two sections of the assembly around electrical conduits holding open lines, and engage the sections together. Thus, with a minimum of effort, a waterproof junction box that complies with building codes is provided.

Therefore, it can be appreciated that there exists a continuing need for a new and improved electrical wiring access box. In this regard, the present invention substantially fulfills this need.

SUMMARY OF THE INVENTION

In view of the foregoing disadvantages inherent in the known types of electrical junction boxes for use in electrical wiring now present in the prior art, the present invention provides an improved apparatus for encapsulating electrical wiring in residences and businesses. As such, the general purpose of the present invention, which will be described subsequently in greater detail, is to provide a new and improved junction box to place electrical connections, and methods of assembly and use, which has all of the advantages of the prior art and none of the disadvantages.

To attain this, the present invention comprises an access box assembly that includes a cover having at least two C-shaped shoulder portions formed with the walls of the cover, and extending perpendicularly at opposing ends. A base, also having at least two C-shaped shoulder portions formed with its side walls, is dimensioned in concert with the cover to hold open connected electrical wires connected via a wire connector. The cover is securely engaged with the base by engagement of the shoulder portions. After engagement, the shoulder portions form tubular projections. The tubular projections form around electrical conduits which hold insulated wire coverings sheathing electrical wires. A gasket, to provide a water proof barrier, is positioned between the perimeter ridge of the cover and the perimeter edge of the base prior to engagement. Complimentary raised edges within the inner wall form a stop ring near the proximal end of the tubular projections to prevent electrical conduits, containing insulated electrical wires, from entering the cavity formed by the cover and the base. Connected electrical wires are isolated from the electrical conduits by the raised edges, thus allowing for code compliance.

Additional embodiments include a four way assembly with four tubular projections formed, a three way assembly and an assembly with two projections formed at 90 degrees separation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description only and should not be regarded as limiting the scope and intent of the invention.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a bottom plan view of the cover of the access box of FIG. 3.

FIG. 5 is a bottom plan view of the cover of the access box of FIG. 6.

FIG. 9 is a perspective view of an additional embodiment constructed in accordance with the invention.

FIG. 10 is a top plan view of the access box of FIG. 9 assembled.

DETAILED DESCRIPTION OF THE INVENTION

Figure 1:
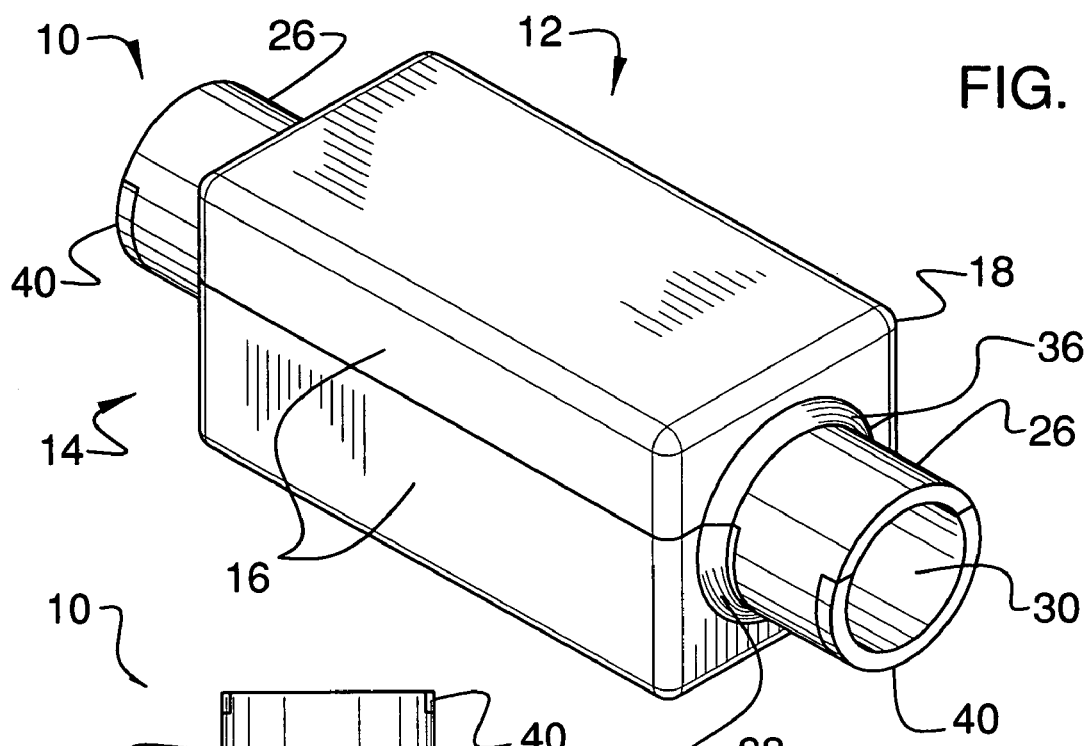
FIG. 1 is a perspective view of a two way access box constructed in accordance with the invention.
Figure 2:
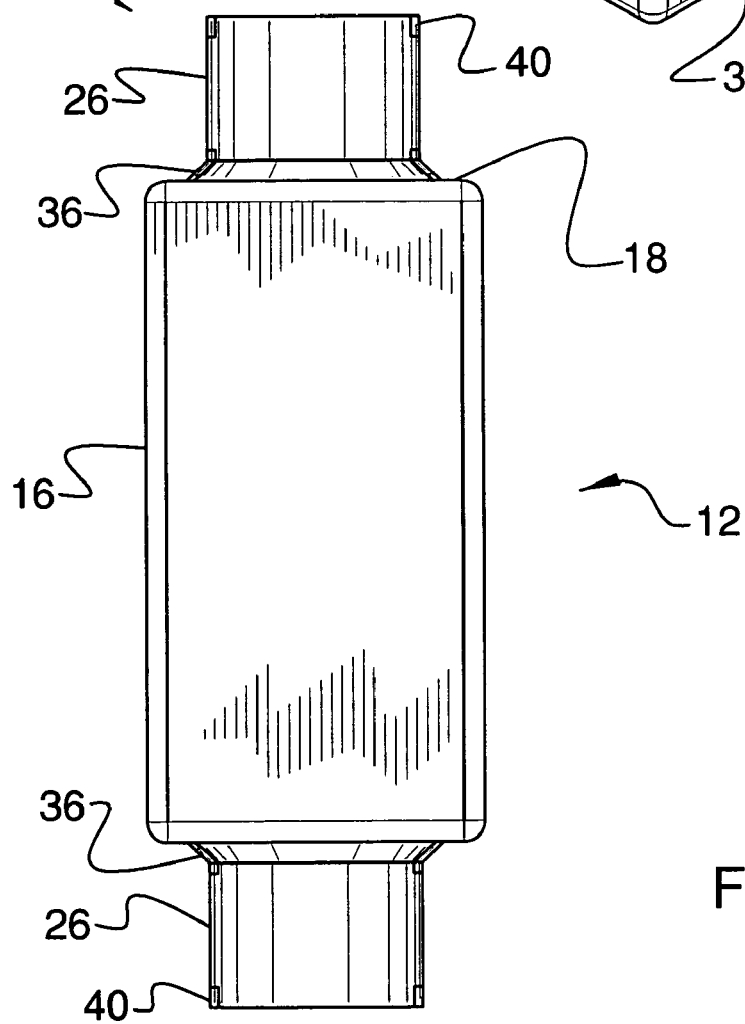
FIG. 2 is a top plan view of the access box of FIG. 1 assembled.

The electrical wiring access box 10 is molded with the preferred material being polyvinyl chloride (PVC). The access box 10 comprises a cover 12, a gasket 34 and a base 14.

FIGS. 1–4 illustrate one embodiment of the invention. The cover 12 and base 14 have a generally rectangular configuration. An open cavity 20, common to both the cover 12 and the base 14, is defined by side walls 16 and end walls 18. First shoulder portions 26, generally C-shaped and bending adjacent to their center, and having an outer surface and an inner surface, are integrally formed with the end walls 18 of the cover 12. The first shoulder portions 26 further comprise a pair of arms 28 extending in a generally common direction from the major bend for defining a space there between for engagement. In the first embodiment of the invention, as referenced in FIGS. 1–3, two first shoulder portions 26 extend perpendicularly outwardly of the cover 12 at opposed ends. A rim 36 is disposed on the proximal end of the first shoulder portion 26. In the preferred embodiment, a ridge 22 is formed at the bottom perimeter edge of the cover 12. It is recognized that the bottom perimeter edge can also be manufactured without a ridge formed, and consist of a flat surface.

With reference to FIGS. 1–4, second shoulder portions 30, being generally C-shaped and bending adjacent to their center, extend perpendicularly outwardly from the end walls 18 of the base 14. The second shoulder portions 30 have an inner and outer surface, a top perimeter edge 24 and a rim 38 disposed on the outer surface proximally. To allow for a tight connection between the cover 12 and the base 14 in the preferred embodiment, the inner diameter of the top perimeter edge 24 of the base 14 has a larger diameter than the outer diameter of the bottom perimeter ridge 22 of the cover 12. A circumferential lip 40 is formed on the outer surface distally. A groove 42 is defined between the rim 38 and the lip 40.

A continuous gasket 34 is optionally provided to be a substantially water-excluding barrier between the cover 12 and the base 14. However, the gasket 34 is not necessary to use the access box 10. The gasket 34 is preferably made of rubber, although other materials with the same properties of water exclusion can be used.

On the inner surface of the shoulder portions 26, 30 near their proximal ends are complimentary arcuate raised edges 44 which form an opening of sufficient size to allow entry of the insulated wire coverings 46 and electrical wires 48 into the cavity 20, yet prevent the entry of an electrical conduit (not shown) into the cavity 20 of the cover 12 and the base 14.

Figure 3:
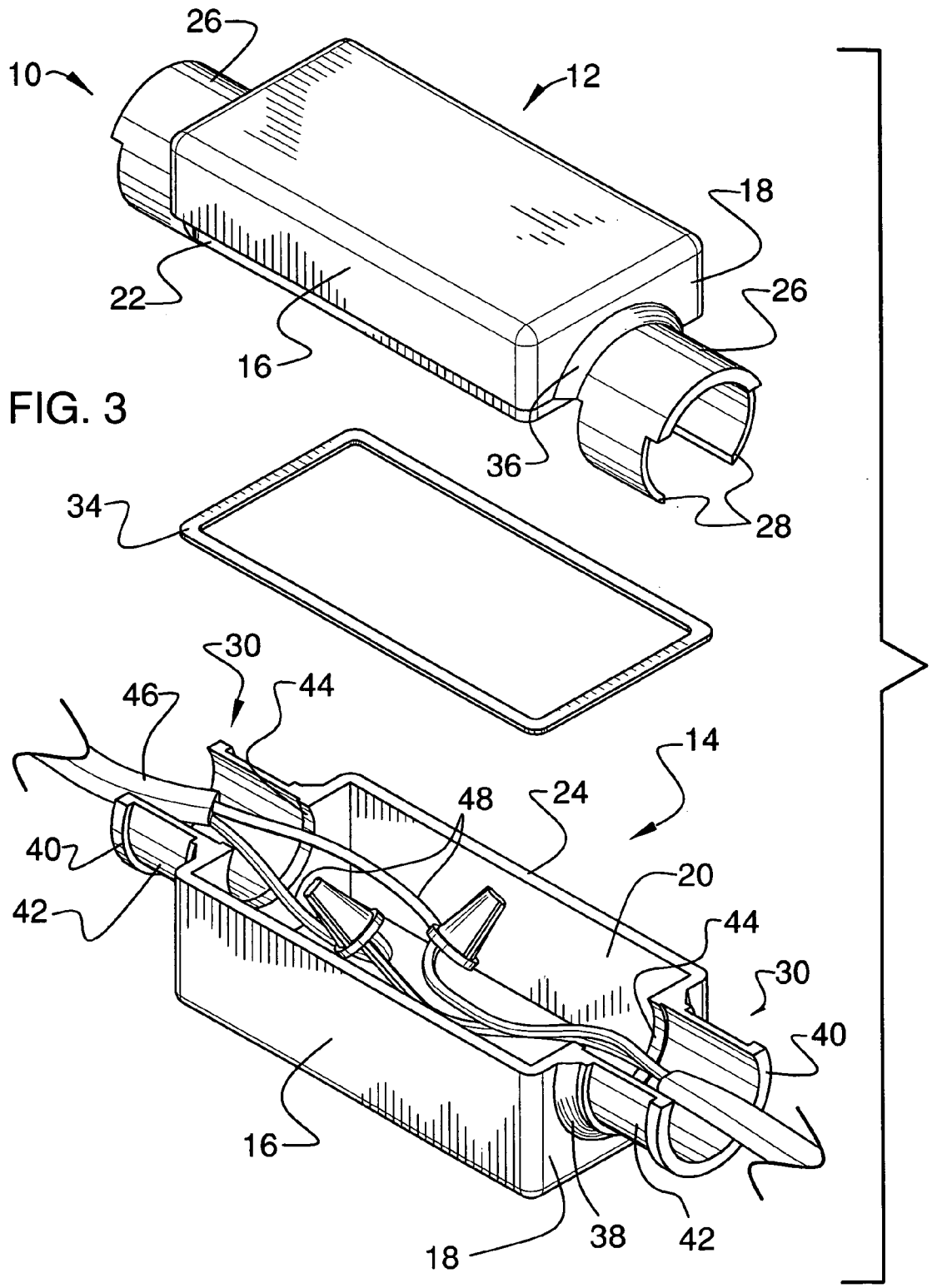
FIG. 3 is an exploded perspective view of the access box of FIG. 1 showing electrical wiring connected and disposed within the base.
Figure 6:
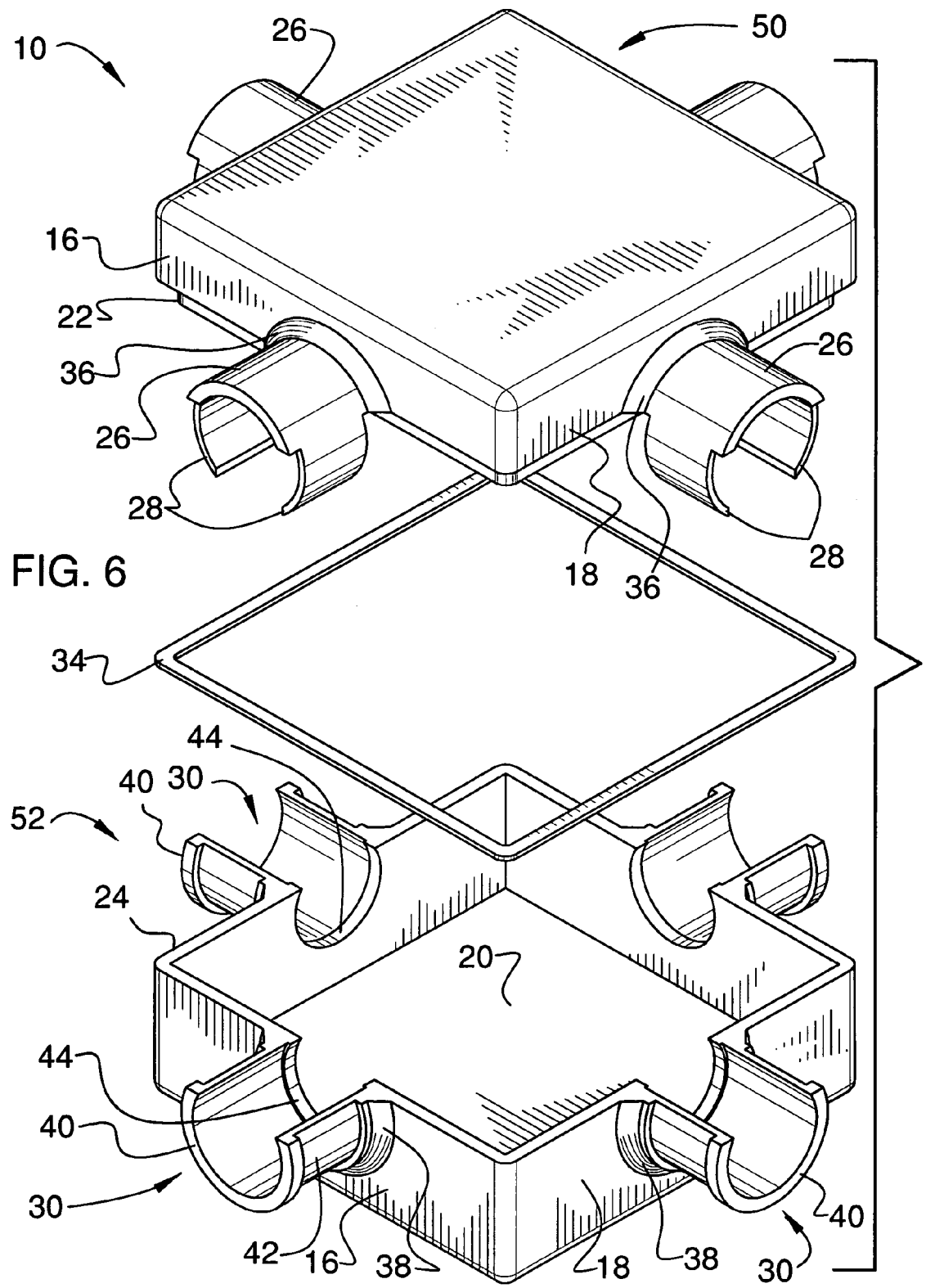
FIG. 6 is an exploded perspective view of an additional embodiment constructed in accordance with the invention.
Figure 7:
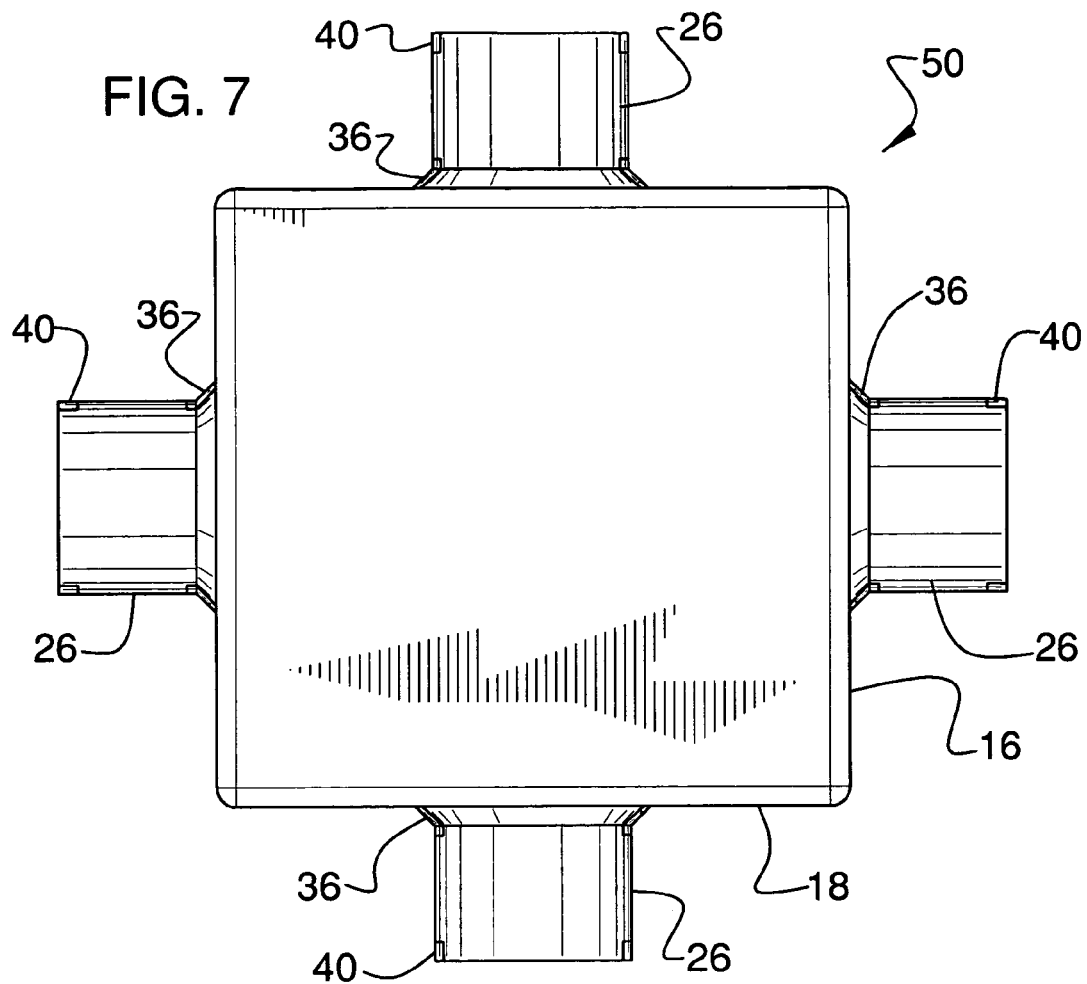
FIG. 7 is a top plan view of the access box of FIG. 6 assembled.
Figure 8:
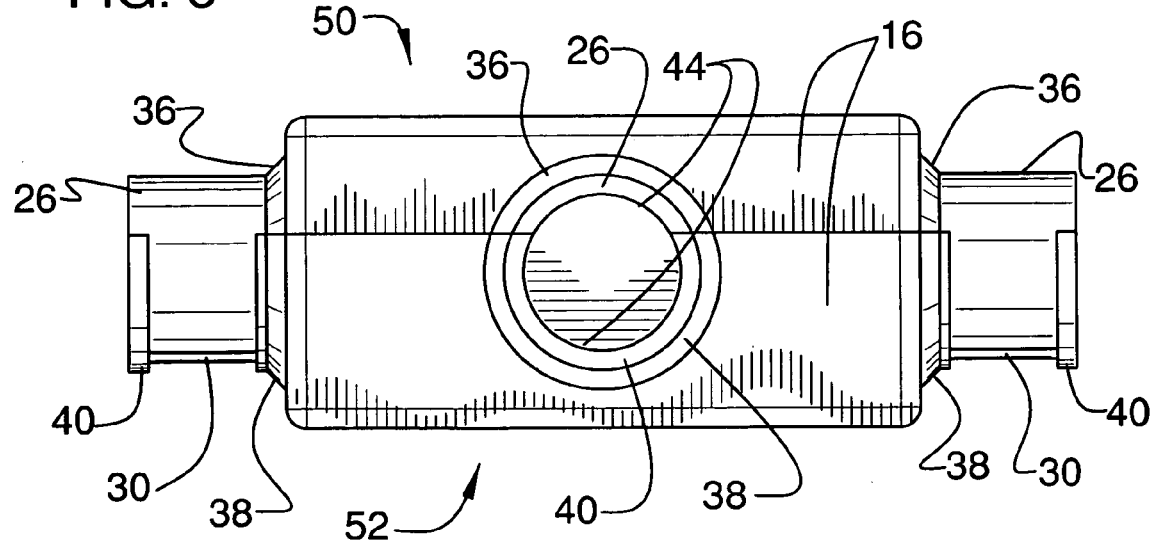
FIG. 8 is a side elevation view of the access box of FIG. 6 assembled.

Now referring to FIG. 3, in assembly, electrical conduits (not shown) containing insulated wire coverings 46, encasing electrical wires 48, are positioned on the inner surface of the second shoulder portion 30 of the base 14, either before or after the electrical wires 48 are connected with wire nuts. The electrical wires 48 are placed in the open cavity 20 of the base 14. If used, the gasket 34 is mounted on the top perimeter edge 24 of the base 14. The base 12 and the cover 14 are brought together with the outer diameter of the perimeter ridge 22 fitting within and abutting the inner diameter of the top perimeter edge 24. A tight fit is thus assured between the cover 12 and the base 14, with the gasket 34 providing a water proof barrier protecting electrical wiring. When the cover 12 and the base 14 are being brought together, the arms 28 of the first shoulder portions 26 are inserted into the groove 42 of the second shoulder portions 30, and engaged. The rim 38 of the second shoulder portions 30, which aligns with the rim 36 of the first shoulder portions 26, and the lip 40 of the second shoulder portions 30 are spaced apart substantially to provide a snug fit with the arms 28. The arms 28 are prevented from moving, and thus the first shoulder portions 26 and second shoulder portions 30 are securely engaged. The tubular projections formed after the engagement of the shoulder portions 26, 30 house electrical conduits containing insulated wire coverings 46. Referring to FIG. 8, after the shoulder portions 26, 30 are connected, the raised edges 44 form substantially a circular barrier which prevents electrical conduits from entering the cavity of the base 14 or cover 12.

To remove the access box 10 from around electrical conduits, the cover 12 and the base 14 can be separated by pulling the arms 28 of the first shoulder portions 26 away from each other and dismounting the cover 12 from the base 14.

Figure 13:
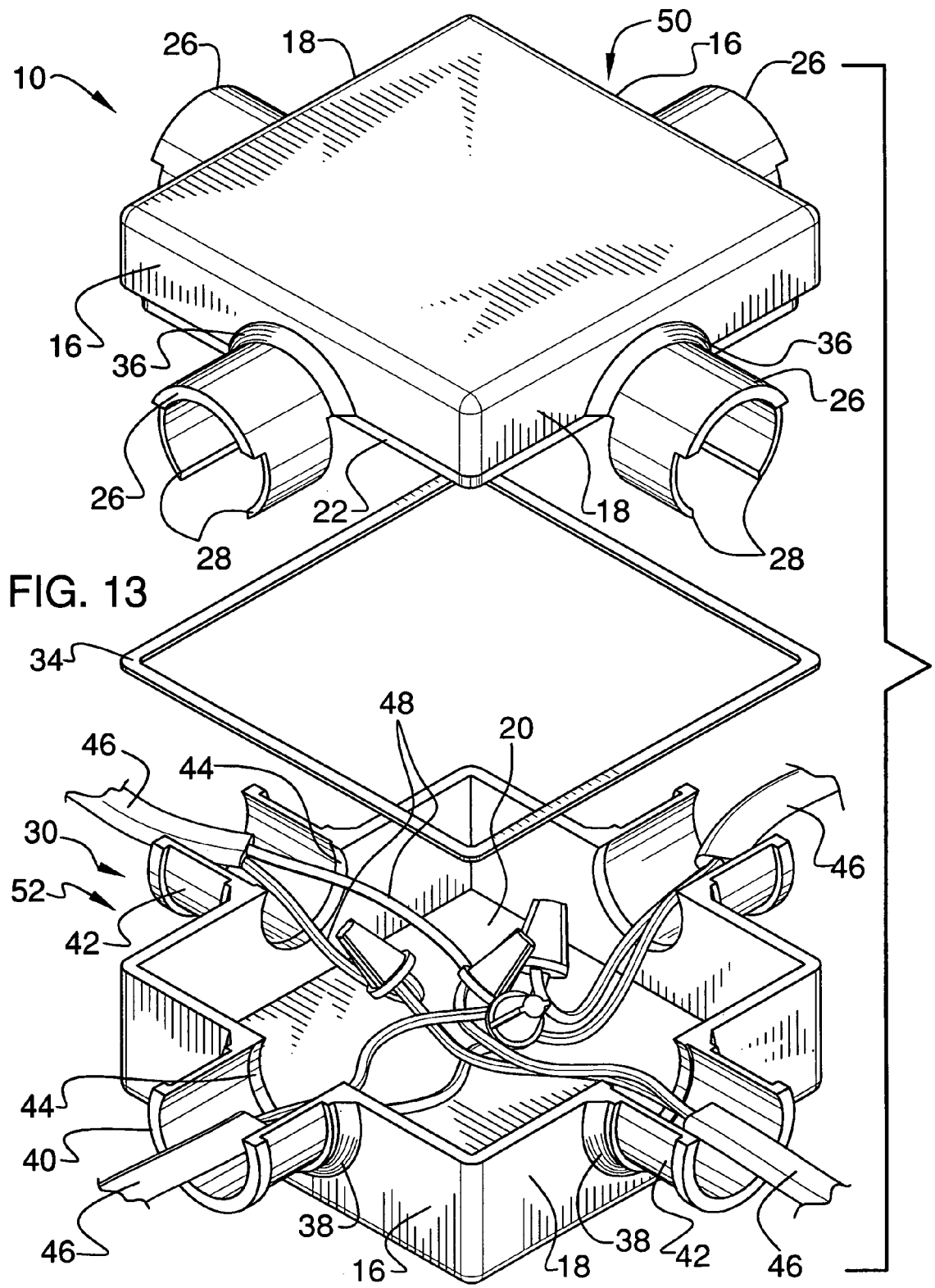
FIG. 13 is an exploded perspective view of the access box of FIG. 6 showing electrical wiring connected and disposed within the base.

Turning now to FIGS. 5–8 and FIG. 13 another embodiment of an electrical wiring access box 10 is disclosed. First shoulder portions 26 are formed at opposing end walls 18 and side walls 16 of a cover 50. Second shoulder portions 30 are formed at opposing end walls 18 and side walls 16 of a base 52. The cover 50 and the base 52 have a generally square configuration. The first shoulder portions 26 and the second shoulder portions 30 at opposing walls extend outwardly along the same longitudinal axis. A gasket 34 is preferably provided for a water proof barrier. FIG. 13 illustrates the electrical wiring 48 after being connected, prior to the cover 50 and the base 52 being in the closed position. This embodiment of the invention 10 allows for insulated wire coverings 46, contained within electrical conduits, to enter from four different directions.

Figure 11:
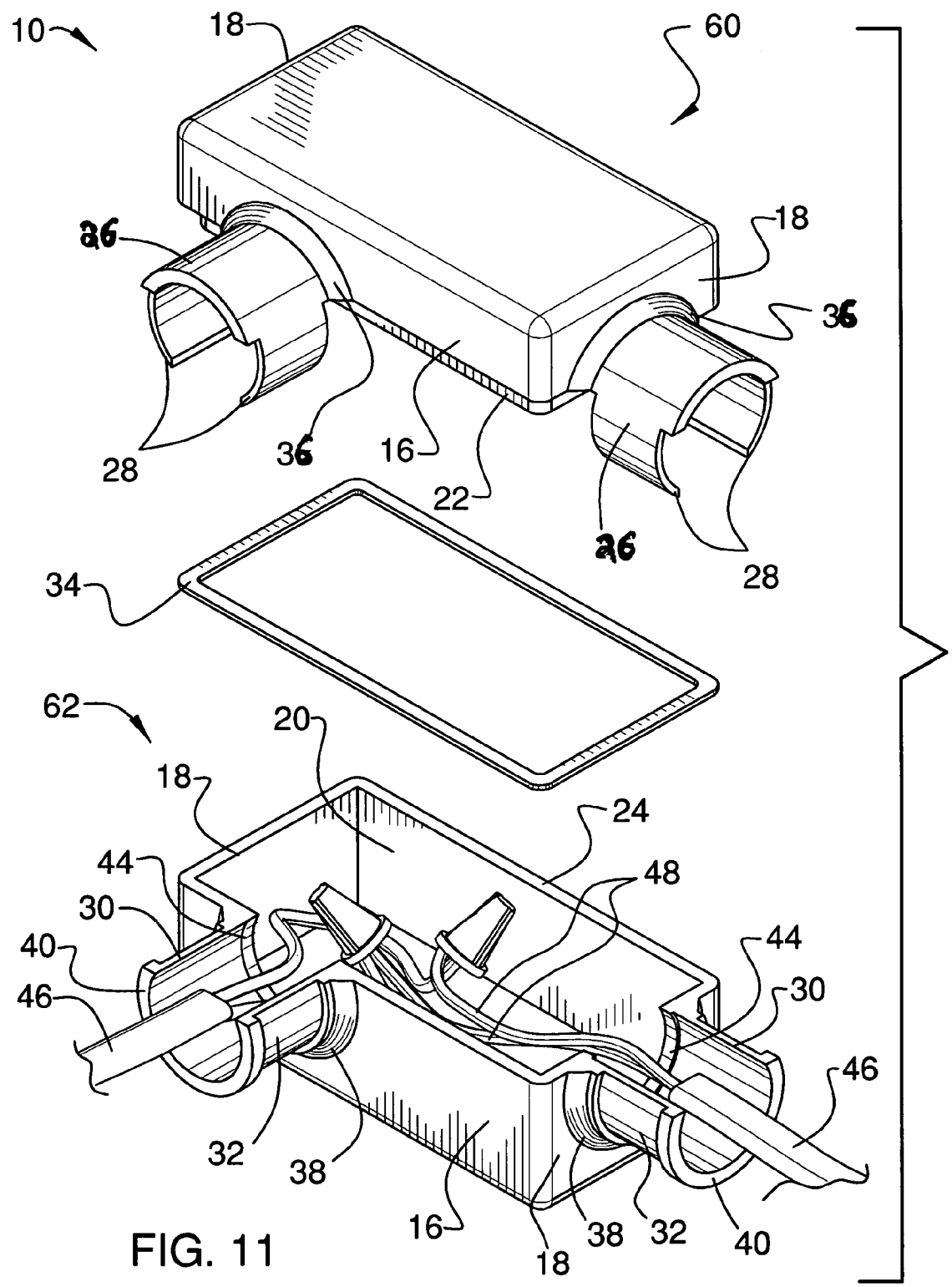
FIG. 11 is an exploded perspective view of the access box of FIG. 9 showing electrical wiring connected and disposed within the base.

Turning now to FIGS. 9, 10 and 11 another embodiment is disclosed. As illustrated in FIG. 11 one first shoulder portion 26 is formed with one side wall 16 of a cover 60 and another first shoulder portion 26 is formed with one end wall 18 of the cover 60. The second shoulder portions 30 are formed similarly on a base 62. The tubular projections formed extend perpendicular to each other at an approximate 90 degree angle. The insulated wire coverings 46 are also aligned perpendicular to each other when the cover 60 and the base 62 are in a closed position. This embodiment is useful in corner of walls in a residence where the electrical wiring within walls meet at a 90 degree angle.

Figure 12:
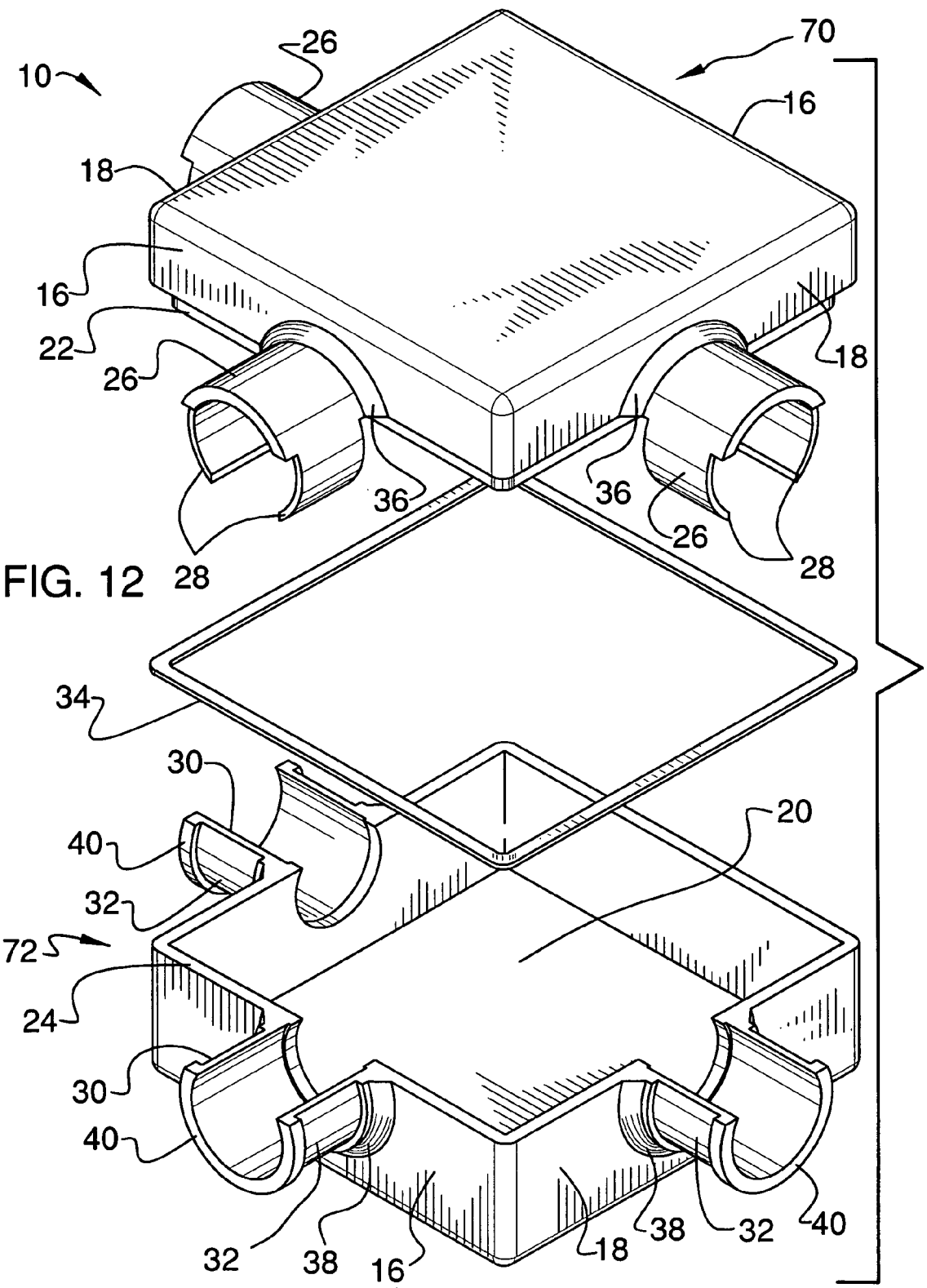
FIG. 12 is an exploded perspective view of an additional embodiment constructed in accordance with the invention.

FIG. 12 discloses another embodiment of the invention 10. A cover 70 has first shoulder portions 26 formed at opposing end walls 18 and one first shoulder portion 26 formed with one side wall 16. A base 72 has second shoulder portions 30 formed at opposing end walls 18 and one second shoulder portion 30 formed with one side wall 16. Electrical wiring can thus be connected in the cavity of the cover 70 and the base 72 from three different directions. The cover 70 and the base 72 have a generally square configuration.

With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, if is not desired to limit the invention to the exact construction and operation shown and described, and accordingly, all suitable modifications and equivalents may be resorted to, falling within the scope of the invention.

I claim:

1. An electrical wiring access box comprising the combination of:
   a cover having a top surface, side walls, end walls, a bottom perimeter ridge and having an open cavity defined by the walls;
   at least two generally C-shaped first shoulder portions integrally formed with the walls of the cover and extending perpendicularly outwardly of the cover, the first shoulder portions bending adjacent to their center, and having an outer surface, an inner surface, a rim formed on the outer surface proximally and a pair of arms extending in a generally common direction;
   a base having a bottom surface, side walls, end walls, a top perimeter edge and having an open cavity defined by the walls, the open cavity of the cover and open cavity of the base defining an area dimensioned to receive electrical wiring, and the top perimeter edge of the base having a larger diameter than the bottom perimeter ridge of the cover;
   at least two generally C-shaped second shoulder portions integrally formed with the walls of the base and extending perpendicularly outwardly, the second shoulder portions bending adjacent to their center, and having an outer surface, an inner surface, a rim formed on the outer surface proximally and a circumferential lip formed on the outer surface distally, the outer surface of the second shoulder portions defining a groove between the rim and the circumferential lip and dimensioned to respectively engage with the arms of the first shoulder portions, the first shoulder portions and second shoulder portions forming tubular projections when the cover and the base are in a closed position;
   so that as the cover and the base are brought together an electrical conduit is positioned in each tubular projection to allow electrical wiring to be connected in the cavity of the cover and the base.

2. The electrical wiring access box of claim 1, wherein the cover and the base have a generally rectangular configuration.

3. The electrical wiring access box of claim 2, further comprising raised edges disposed on the inner surface proximally of the first shoulder portions and the second shoulder portions, the edges positioned to align when the cover and the base are in the closed position and provide a barrier preventing the entry of the electrical conduits into the open cavity of the cover and the base.

4. The electrical wiring access box of claim 3, wherein one first shoulder portion is formed with one end wall of the cover and another first shoulder portion is formed at the opposing end wall of the cover, one second shoulder portion is formed with one end wall of the base and another second shoulder portion is formed at the opposing end wall of the base; and
   wherein the tubular projections formed by the engagement of the first shoulder and second shoulder portions extend outwardly along the same longitudinal axis.

5. The electrical wiring access box of claim 3, wherein one first shoulder portion is formed with one end wall of the cover, another first shoulder portion is formed with one side wall of the cover, one second shoulder portion is formed with one end wall of the base, and another second shoulder portion is formed with one side wall of the base; and
   wherein the tubular projections formed by the engagement of the first and second shoulder portions extend perpendicular to each other at an approximate 90 degree angle.

6. The electrical wiring access box of claim 1, wherein the cover and the base are formed from polyvinyl chloride.

7. The electrical wiring access box of claim 1, further comprising a continuous gasket dimensioned to set upon the top perimeter edge of the base wherein the gasket forms a substantially water-excluding barrier when the cover is engaged with the base.

8. An electrical wiring access box comprising the combination of:
   a cover having a top surface, side walls, end walls, a bottom perimeter ridge and having an open cavity defined by the walls;
   two generally C-shaped first shoulder portions integrally formed with the side walls of the cover and two generally C-shaped first shoulder portions integrally formed with the end walls of the cover, the first shoulder portions being opposed and extending perpendicularly outwardly of the cover, the first shoulder portions bending adjacent to their center, and having an outer surface, an inner surface, a rim formed on the outer surface proximally and a pair of arms extending in a generally common direction;
   a base having a bottom surface, side walls, end walls, a top perimeter edge and having an open cavity defined by the walls, the open cavity of the cover and open cavity of the base defining an area dimensioned to receive electrical wiring, and the top perimeter edge of the base having a larger diameter than the bottom perimeter ridge of the cover;
   two generally C-shaped second shoulder portions integrally formed with the side walls of the base and two generally C-shaped second shoulder portions integrally formed with the end walls of the base, the second shoulder portions being opposed and extending perpendicularly outwardly, the second shoulder portions bending adjacent to their center, and having an outer surface, an inner surface, a rim formed on the outer surface proximally and a circumferential lip formed on the outer surface distally, the outer surface of the second shoulder portions defining a groove between the rim and the circumferential lip and dimensioned to respectively engage with the arms of the first shoulder portions, the first shoulder portions and second shoulder portions forming tubular projections when the cover and the base are in a closed position;

so that as the cover and the base are brought together an electrical conduit is positioned in each tubular projection to allow electrical wiring to be connected in the cavity of the cover and the base.

9. The electrical wiring access box of claim 8, wherein the cover and the base have a generally square configuration.

10. The electrical wiring access box of claim 8, further comprising a continuous gasket dimensioned to set upon the top perimeter edge of the base wherein the gasket forms a substantially water-excluding barrier when the cover is engaged with the base.

* * * * *